Figure 1:
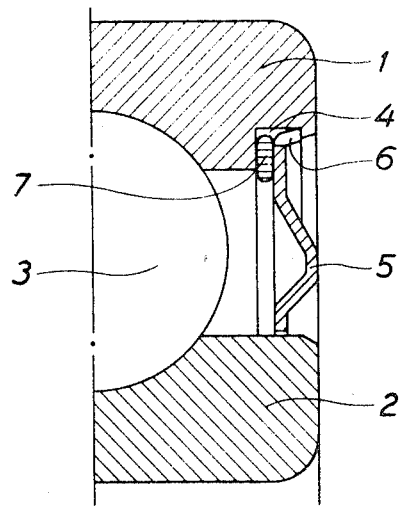

United States Patent

[11] 3,597,030

| | | |
|---|---|---|
| [72] | Inventor | Stig Lennart Hallerback<br>Vastra Frolunda, Sweden |
| [21] | Appl. No. | 818,264 |
| [22] | Filed | Apr. 22, 1969 |
| [45] | Patented | Aug. 3, 1971 |
| [73] | Assignee | Aktiebolaget Svenska Kullagerfabriken<br>Goteborg, Sweden |

[54] SEALING DEVICE FOR ROLLING BEARINGS
1 Claim, 3 Drawing Figs.

| | | |
|---|---|---|
| [52] | U.S. Cl. | 308/187.2 |
| [51] | Int. Cl. | F16c 33/78 |
| [50] | Field of Search | 308/187.2 |

[56] References Cited
UNITED STATES PATENTS

| | | | |
|---|---|---|---|
| 2,718,441 | 9/1955 | Smith | 308/187.2 |
| 2,755,113 | 8/1956 | Baumsheckel | 308/187.2 |

*Primary Examiner*—Mark M. Newman
*Assistant Examiner*—Randall Heald

*Attorney*—Howson & Howson

ABSTRACT: A seal for a rolling bearing consisting of a pair of rings radially spaced apart to define a space for a plurality of rolling elements, one of said rings having an annular groove spaced from one axial end of said ring by a circumferentially extending axial wall section, said groove facing said annular space and having a pair of circumferentially extending, axially spaced confronting radial walls, an annular resilient member mounted on one of the walls of said groove, said seal for sealing at least one side of the annular space comprising a body portion spanning the annular space including a radial wall portion and plurality of circumferentially spaced fingers projecting from said radial wall portion and extending generally transversely thereto, the circular trace of the terminal ends of the fingers in the relaxed state being of a diametral dimension in relation to the diameter of the axial wall section of said one ring so that upon installation of the seal, the fingers are displaced radially in one direction to permit passage of the seal past said axial wall section and deflect in a radial direction opposite said one direction when the seal is aligned with said groove so that the terminal ends of the fingers in the seated position of said seal engage one of the radial walls of said groove and the radial wall portion of said seal presses against the annular resilient member on the other radial wall of said groove.

SEALING DEVICE FOR ROLLING BEARINGS

The present invention relates to a sealing device for rolling bearings comprising inner and outer race rings having rolling bodies arranged between them. The sealing device consists of a sealing closure of a rigid material which at one edge is attached to one of the race rings while the other extends against a surface located at one side of the race of the rolling bodies in the other race ring. The invention also refers to a method of mounting a sealing device of this kind.

The invention is characterized mainly thereby that the sealing device consists of a closure of rigid material, said closure at one edge being provided with a series of laterally extending, resilient teeth, intended to deformingly contact one of the sidewalls in a groove in one of the race rings and that said teeth-shaped rim at one of its sides in said groove cooperates with an annular elastic securing and sealing element.

The invention will be described in the following with reference to the accompanying drawing, FIG. 1 of which shows a part of a section through a rolling bearing provided with a sealing device according to the invention. FIG. 2 shows a part of a view of the sealing device as seen from outside the bearing and FIG. 3 a device for practicing the mounting method.

Figure 2:
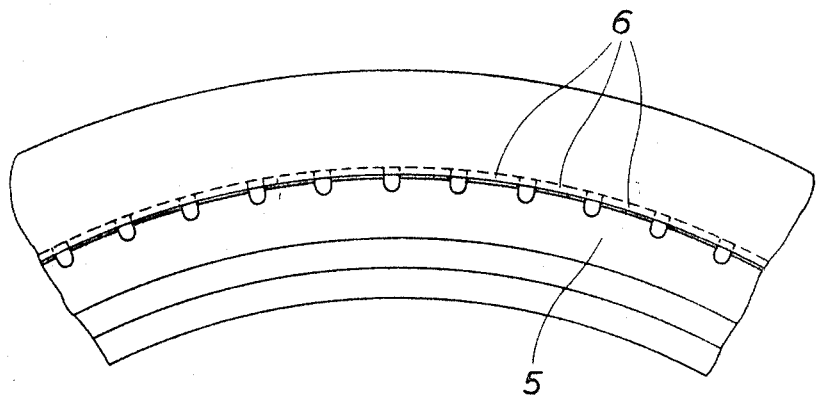

The example shown in FIG. 1 relates to a deep groove ball bearing but the sealing device may be applied to any rolling bearing having the outer possibilities for adapting the seal.

The sealing device may be adapted on one or both sides of the rolling bodies dependent on what type of application the bearing should be applied to. FIG. 1 shows the outer race ring 1 of the bearing, the inner race ring 2 and the rolling bodies 3 arranged therebetween. One edge of the sealing closure 5 is inserted in a groove 4, here shown in the outer race ring 1. This edge of the sealing closure is—which best can be seen in FIG. 2—provided with a series of laterally extending resilient teeth 6. These teeth are intended to deformingly contact one of the sidewalls of the groove 4. The sealing closure may suitably be made of metal, but a rigid plastics may also be used for this part of the seal. To reinforce the sealing closure it may—as shown in the embodiment according to FIG. 1—be given a bent or waved shape. Such an embodiment also entails an enlarged lubricant space between rolling bodies and sealing closure. Between the inner wall of the groove 4 and the teeth-provided rim of the sealing closure there has been inserted an annular element 7 made by a grease-resistant rubber, an appropriate plastic material or any material having elastic characteristics, in such a way that this element will cooperate with the sealing closure with sealing and securing function. At the portion of the sealing closure turned to the groove 4 the closure joins under sealing action the peripheral surface of the inner race ring beside the rolling bodies. To improve the sealing effect a convenient sealing collar of elastic material intended to cooperate with the surface of the inner race ring may be arranged at this portion of the sealing closure or an elastic element may be arranged in the race ring, said element cooperating with the rigid sealing closure.

Figure 3:
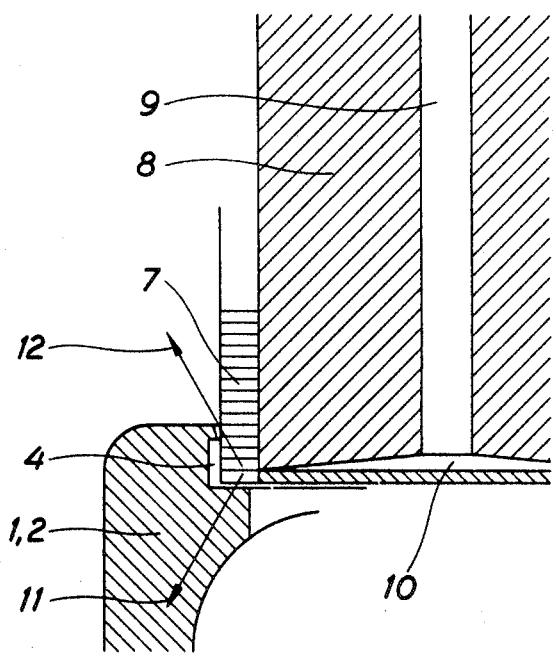

The manufacture and mounting of the annular element 7 is carried out in the following manner. FIG. 3 shows a part of a section of one of the race rings 1 or 2 of the bearing having the groove 4 intended for the sealing device. In connection to this groove a mandrel 8 has been applied, said mandrel being part of a mounting tool, having a great number of the annular elements 7 of the sealing device arranged thereon. These elements are prefabricated so that a tube of elastic material having an appropriate goods thickness is thread on the mandrel 8 and then cut to a number of annular elements of proper dimension. When the mandrel is located as shown in FIG. 3, air of high pressure is fed through the duct 9 in the central part of the mandrel and this air is pressed further through a number of grooves 10 having an orifice at the cylindrical periphery of the mandrel in the interspace between the first two annular elements on the front end of the mandrel. Due to the pressure blow which is exerted at the end of the groove the first annular element will be pressed into the groove 4 in the direction shown by the arrow 11, whereby the second annular element together with the elements located thereabove will be lifted a small distance in the direction shown by the arrow 12 and thus an efficient partition of said elements is obtained.

The mandrel 8 is then withdrawn from the bearing with the element 7 now fixed in the groove 4, and the rigid sealing closure is then fixed to said groove by means of another tool, not shown.

I claim:

1. A seal for a rolling bearing consisting of a pair of rings radially spaced apart to define a space for a plurality of rolling elements, one of said rings having an annular groove spaced from one axial end of said ring by a circumferentially extending axial wall section, said groove facing said annular space and having a pair of circumferentially extending, axially spaced confronting radial walls, an annular resilient member mounted on one of the radial walls of said groove, said seal for sealing at least one side of the annular space comprising a body portion spanning the annular space including a radial wall portion and plurality of circumferentially spaced fingers projecting from said radial wall portion and extending generally transversely thereto, the circular trace of the terminal ends of the fingers in the relaxed state being of a diametral dimension in relation to the diameter of the axial wall section of said one ring so that upon installation of the seal, the fingers are displaced radially in one direction to permit passage of the seal past said axial wall section and deflect in a radial direction opposite said one direction when the seal is aligned with said groove so that the terminal ends of the fingers in the seated position of said seal engage the radial wall of said groove opposite said one radial wall and the radial wall portion of said seal presses against the annular resilient member on said one radial wall of said groove.